US008218659B2

(12) United States Patent
Ichikawa (10) Patent No.: US 8,218,659 B2
(45) Date of Patent: Jul. 10, 2012

(54) OFDM DEMODULATION DEVICE (75) Inventor: Tomoyuki Ichikawa, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 996 days.

(21) Appl. No.: 12/193,147

(22) Filed: Aug. 18, 2008

(65) Prior Publication Data
US 2009/0080548 A1 Mar. 26, 2009

(30) Foreign Application Priority Data

Sep. 20, 2007 (JP) .................... 2007-243597

(51) Int. Cl.
*H04L 27/28* (2006.01)
(52) U.S. Cl. ........ 375/260; 375/267; 375/316; 375/343; 370/203; 370/208; 370/210; 370/343
(58) Field of Classification Search .................. 375/260, 375/267, 316, 343; 370/203, 208, 210, 343
See application file for complete search history.

(56) References Cited

U.S. PATENT DOCUMENTS 6,774,829 B2 * 8/2004 Nakada et al. ............... 341/126

2003/0228887 A1* 12/2003 Kishigami et al. ............ 455/561
2005/0147186 A1* 7/2005 Funamoto et al. ............ 375/324
2008/0095280 A1* 4/2008 Akahori ........................ 375/343

FOREIGN PATENT DOCUMENTS

JP 2000-165338 6/2000
JP 2004-328583 11/2004

\* cited by examiner

*Primary Examiner* — Eva Puente
*Assistant Examiner* — Eboni Hughes
(74) *Attorney, Agent, or Firm* — Studebaker & Brackett PC; Donald R. Studebaker (57) ABSTRACT

A delay indicator calculator calculates at least two of a first delay indicator indicating a delay time determined based on a correlation value having a predetermined difference from the maximum value of the correlation signal, a second delay indicator indicating a change of a delay time determined based on time during which the correlation signal has no less than a predetermined value, and a third delay indicator indicating a change of a time difference between main and delay path peaks. An estimator generates a state estimation of the transmission path based on the probabilities of the at least two delay indicator values exceeding respective reference values for a plurality of symbols.

15 Claims, 9 Drawing Sheets

| | | Multipath - Delay time between paths | Multipath - Power difference between paths | Noise | Movement speed | Received input level |
|---|---|---|---|---|---|---|
| Delay Indicator Calculator A1 | Influence of characteristic change Δ upon detected value d1 | LARGE | LARGE | LARGE | SMALL | LARGE |
| | Relation between characteristic change Δ and detected value d1 | Δ:SMALL → d1:SMALL<br>Δ:LARGE → d1:LARGE | Δ:SMALL → d1:LARGE<br>Δ:LARGE → d1:SMALL | Δ:SMALL → d1:SMALL<br>Δ:LARGE → d1:LARGE | (NOT UNIFORM) | Δ:SMALL → d1:LARGE<br>Δ:LARGE → d1:SMALL |
| | Possibility of state determination by detected value | ○ | ○ | ○ | (NOT POSSIBLE) | ○ |
| Delay Indicator Calculator A2 | Influence of characteristic change Δ upon detected value d2 | LARGE | SMALL | SMALL | SMALL | SMALL |
| | Relation between characteristic change Δ and detected value d2 | Δ:SMALL → d2:SMALL<br>Δ:LARGE → d2:LARGE | (NOT UNIFORM) | Δ:SMALL VARIATION:SMALL<br>Δ:LARGE VARIATION:LARGE | (NOT UNIFORM) | (NOT UNIFORM) |
| | Possibility of state determination by detected value | ○ | (NOT POSSIBLE) | ○ | (NOT POSSIBLE) | (NOT POSSIBLE) |
| Delay Indicator Calculator A3 | Influence of characteristic change Δ upon detected value d3 | LARGE | LARGE | LARGE | LARGE | LARGE |
| | Relation between characteristic change Δ and detected value d3 | Δ:SMALL → d3:SMALL<br>Δ:LARGE → d3:LARGE | Δ:SMALL → d3:LARGE<br>Δ:LARGE → d3:SMALL | (NOT UNIFORM) | Δ:SMALL VARIATION:SMALL<br>Δ:LARGE VARIATION:LARGE | (NOT UNIFORM) |
| | Possibility of state determination by detected value | ○ | ○ | (NOT POSSIBLE) | ○ | (NOT POSSIBLE) |

| | | MULTIPATH | | NOISE | MOVEMENT SPEED | RECEIVED INPUT LEVEL |
|---|---|---|---|---|---|---|
| | | DELAY TIME BETWEEN PATHS | POWER DIFFERENCE BETWEEN PATHS | | | |
| DELAY INDICATOR CALCULATOR A4 | INFLUENCE OF CHARACTERISTIC CHANGE Δ UPON DETECTED VALUE d4u, d4d | LARGE | LARGE | LARGE | SMALL | LARGE |
| | RELATION BETWEEN CHARACTERISTIC CHANGE Δ AND DETECTED VALUE | Δ:SMALL → d4u: LARGE → d4d: LARGE Δ:LARGE → d4u: SMALL → d4d: SMALL | Δ:SMALL → d4u: SMALL → d4d: SMALL Δ:LARGE → d4u: LARGE → d4d: LARGE | (NOT UNIFORM) | (NOT UNIFORM) | Δ:SMALL → d4u: SMALL → d4d: SMALL Δ:LARGE → d4u: LARGE → d4d: LARGE |
| | POSSIBILITY OF STATE DETERMINATION BY DETECTED VALUE | ○ | ○ | ○ | (NOT POSSIBLE) | ○ |

FIG.9

OFDM DEMODULATION DEVICE

BACKGROUND OF THE INVENTION

1. Field of the Invention

The present invention relates to an Orthogonal Frequency Division Multiplexing (OFDM) demodulation apparatus that demodulates OFDM-modulated signals.

2. Description of the Related Art

OFDM modulation, which has a variety of advantages, has been widely used as a multicarrier transmission method for terrestrial digital broadcasting or wireless LAN.

Since OFDM modulation uses a plurality of periodic waveforms, adding a copy of part of an OFDM modulation waveform as a repeated waveform increases resistance in multipath reception. The added waveform part is generally referred to as a guard interval (GI) or a cyclic prefix.

A conventional correlator determines a correlation between a received signal and a part of the received signal corresponding to a guard interval delayed by an effective OFDM symbol. In conventional time synchronization methods, a time position at which the correlation value output from the correlator is maximized in an OFDM symbol period is detected using such a correlator, and a Fast Fourier Transform (FFT) input window position is determined based on the detected time position.

However, there are problems such as a reduction in the correlation value, failing to achieve time synchronization, and degradation of reception characteristics due to variations of transmission path conditions when reception power is low, when the influence of fading and multipath is high, or when a narrow-band noise signal is included in a received band.

Japanese Patent Application Publication No. 2000-165338 describes improvement of reception characteristics by achieving correct symbol synchronization under multipath environments and Japanese Patent Application Publication No. 2004-328583 describes improvement of reception performance by obtaining delayed wave information based on a self-correlation value under a long-delay multipath environment.

However, when OFDM signals are demodulated, it is necessary to perform correct demodulation on the OFDM signals regardless of changes of transmission path states or conditions. Thus, there is a need to realize an effective demodulation device that can perform correct demodulation operations according to changes of transmission path conditions.

SUMMARY OF THE INVENTION

Therefore, the present invention has been made in view of the above problems, and it is an object of the invention to provide a transmission path state estimator that can highly reliably estimate transmission path states and to provide an OFDM demodulation device that includes the transmission path state estimator and can perform correct demodulation operations according to changes of transmission path states.

In accordance with the present invention, the above and other objects can be accomplished by the provision of an OFDM demodulation device for demodulating an Orthogonal Frequency Division Multiplexing (OFDM) signal received through a transmission path, the demodulation device including a correlator for detecting a correlation signal based on the OFDM signal, a delay indicator calculator for calculating at least two of a plurality of delay indicator values including a first delay indicator value indicating a delay time interval determined based on a correlation value having a predetermined difference from a maximum peak value of the correlation signal in a symbol duration of the OFDM signal, a second delay indicator value indicating a change of a delay time interval determined based on a time during which a value of the correlation signal is equal to or greater than a predetermined correlation value in the symbol duration of the OFDM signal, and a third delay indicator value indicating a change of a time difference between a main path peak and a delay path peak in the symbol duration of the OFDM signal, a delay indicator determinator for calculating respective probabilities of the at least two delay indicator values exceeding respective determination reference values in a plurality of symbol durations of the OFDM symbol; and a transmission path state estimator for generating a state estimation value of the transmission path based on the respective probabilities of the at least two delay indicator values.

The delay indicator determinator calculates respective probabilities of the first to third delay indicator values exceeding respective reference values and the transmission path state estimator performs weighted calculation on the respective probabilities to generate the transmission path state estimation value.

The transmission path state estimator estimates a noise state of the transmission path based on the first and second delay indicator values and estimates a state regarding movement speed of the demodulation device based on the third delay indicator value.

The demodulation device may further include an OFDM demodulator that switches between demodulation operation modes based on the state estimation value of the transmission path.

The OFDM demodulation device of the invention determines a plurality of delay indicator values associated with multipath delay of an OFDM signal from a correlation signal waveform and calculates respective probabilities of the plurality of delay indicator values exceeding respective determination reference values. The OFDM demodulation device then estimates the state of the transmission path by combining the respective probabilities.

Thus, the transmission path state estimator according to the invention can highly reliably estimate transmission path states from the correlation signal waveform. In addition, the demodulation device according to the invention can perform correct demodulation operations according to changes of transmission path states by switching between operation modes according to the transmission path state estimation.

BRIEF DESCRIPTION OF THE DRAWINGS

The above and other objects, features and other advantages of the invention will be more clearly understood from the following detailed description taken in conjunction with the accompanying drawings, in which:

FIG. 5 illustrates relations between transmission path state elements (multipath, noise, movement speed, and received input level) and detected characteristic values d1 to d3 calculated by first to third delay indicator calculators A1, A2, and A3;

DETAILED DESCRIPTION OF THE PREFERRED EMBODIMENTS

Embodiments of the invention will now be described in detail with reference to the accompanying drawings. In the drawings described below, the same reference numerals will be used to refer to substantially the same or equivalent portions.

First Embodiment

Figure 1:
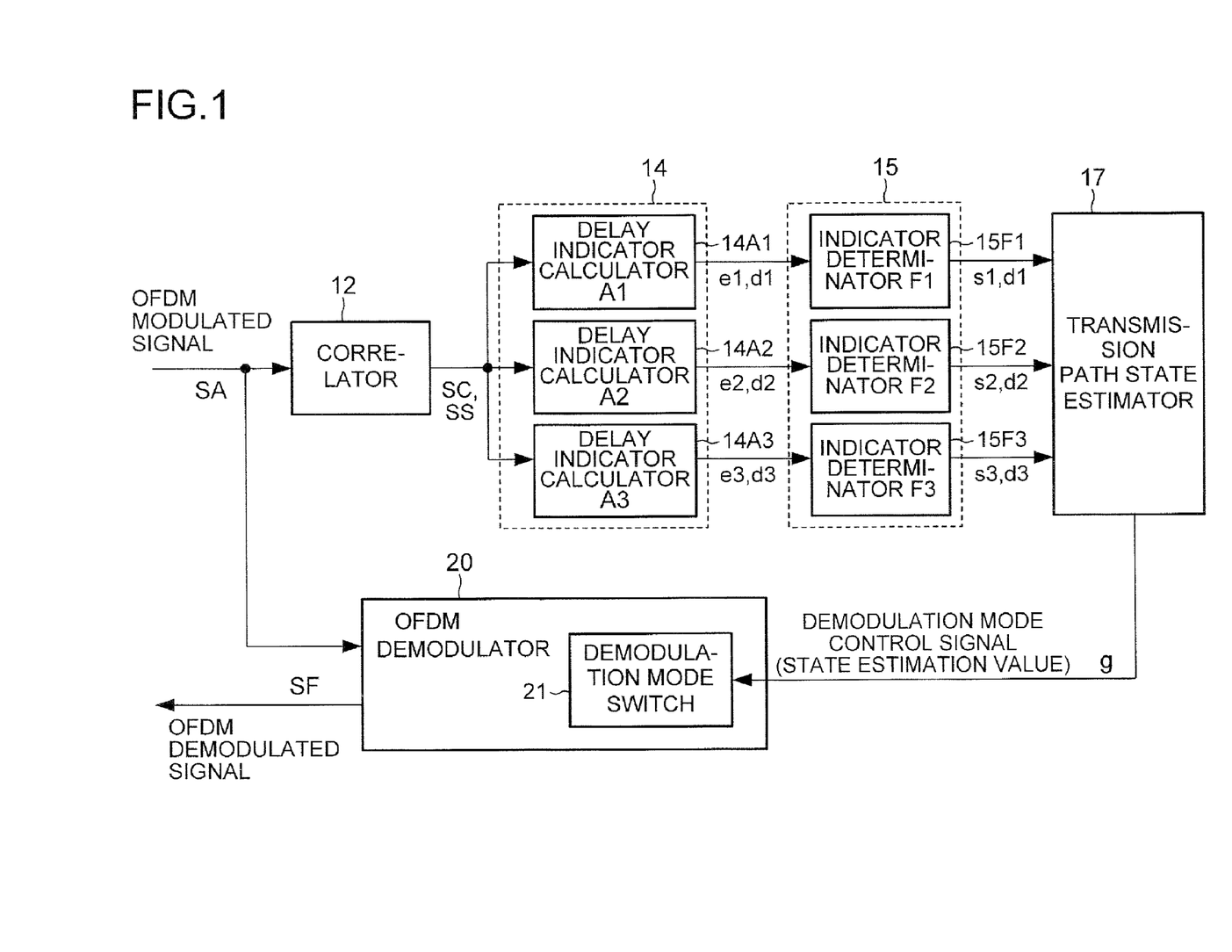
FIG. 1 schematically illustrates an example of an OFDM demodulation device according to a first embodiment of the invention.

FIG. 1 schematically illustrates an example configuration of an OFDM demodulation device 10 according to a first embodiment of the invention.

A received OFDM modulated signal SA is input to a correlator 12. The correlator 12 generates a correlation signal SC based on the OFDM modulated signal SA. The correlator 12 also generates an OFDM-symbol-period synchronization signal SS.

The correlation signal SC and the synchronization signal SS are provided to a delay indicator calculator 14. The delay indicator calculator 14 calculates an indicator or indicator value indicating a multipath delay, which will be referred to as a multipath indicator or indicator value, based on the correlation signal SC and the synchronization signal SS. The calculated delay indicator is provided to an indicator determinator 15.

The delay indicator calculator 14 is constructed so as to calculate a plurality of delay indicators and the indicator determinator 15 is constructed so as to generate indicator determination values (described below) based on the plurality of delay indicators.

This embodiment will be described with reference to an example where the delay indicator calculator 14 includes three delay indicator calculators 14A1, 14A2, and 14A3 (i.e., first to third delay indicator calculators A1, A2, and A3) that calculate three delay indicators and the indicator determinator 15 includes three indicator determinators 15F1, 15F2, and 15F3 (i.e., first to third indicator determinators F1, F2, F3) that generate indicator determination values as respective determination results of the three delay indicators.

Configuration and Operation of Delay Indicator Calculator

First, the operation of the first delay indicator calculator (A1) 14A1 is described as follows with reference to the drawings. When no multipath is present, the correlation signal SC from the correlator 12 has a triangular waveform that has a peak at a time position corresponding to a main incoming path M which will also be referred to as a "main path" for short.

On the other hand, when a long delay multipath is present, the respective incoming time positions of the main incoming path and the long delay path are highly correlated to form a trapezoidal correlation waveform having two peaks spaced at an interval corresponding to a delay time between the two paths. That is, as shown in FIG. 2, due to the main incoming path M and the delay path S, the correlation signal waveform SC from the correlator 12 has a peak correlation value lower than when only one path is present and has a trapezoidal shape having a wide base.

In addition, in actual communication conditions, the two peaks vary in height due to the influence of the interference power component or the waveform of the OFDM modulated signal. Therefore, when time synchronization of FFT input signals is performed using such a correlation output, the time position at which the correlation is maximized is switched between the two time positions spaced by the long delay time of the two paths, thereby causing a reduction in reception performance such as a reduction in the reliability or stability of time synchronization in the background art.

Figure 2:
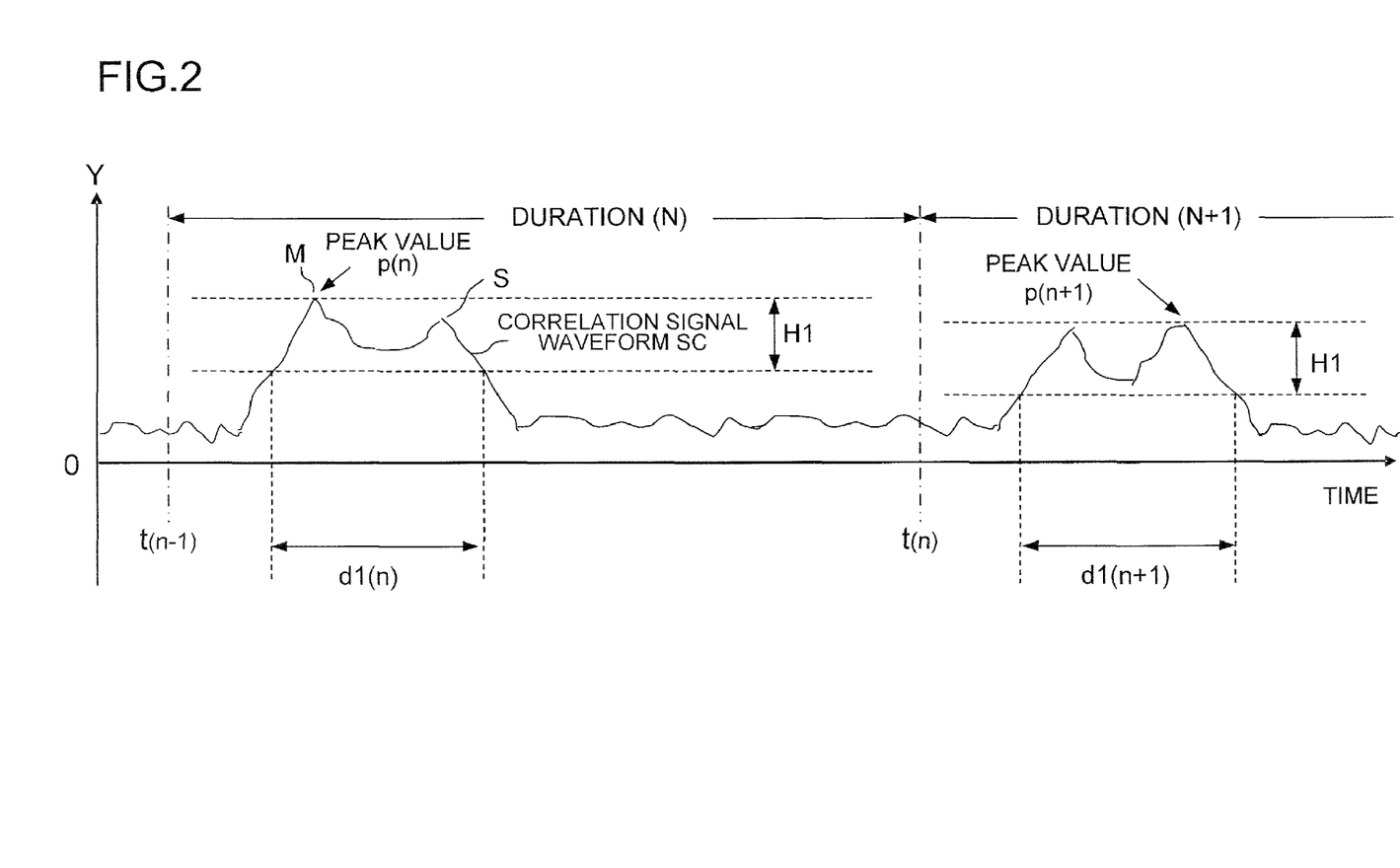
FIG. 2 illustrates a time interval $d1(n)$ of a correlation waveform SC detected by a first delay indicator calculator A1.

In this embodiment, as shown in FIG. 2, the first delay indicator calculator 14A1 detects a time interval d1($n$) of a correlation waveform SC based on a correlation value "y" that has a predetermined difference "H1" from the peak value (or maximum value) "p(n)" of the correlation waveform SC in an n-th symbol duration (duration (n)) that begins at a symbol division time "t(n−1)" and ends at "t(n)." That is, the first delay indicator calculator 14A1 directly outputs the time interval d1($n$), which is a detected value of a characteristic regarding multipath delay (which will also be referred to as a "first delay characteristic value"), as a first delay indicator (or indicator value) e1($n$), i.e., as a calculated delay indicator value (e1($n$)=d1($n$)). More specifically, in the symbol duration (n), the time interval d1($n$) which is an interval between two points at which the correlation waveform and a correlation level of "p(n)−H1" cross each other is calculated as the first delay indicator e1($n$). That is, the first delay indicator e1($n$) (=d1($n$)) is a period (time interval) during which a condition of "y>p(n)−H1" (y: correlation value) is satisfied in the symbol duration (n).

In the next symbol duration (i.e., (n+1)th symbol duration (n+1)), the first delay indicator calculator 14A1 also detects a time interval d1($n$+1) of a correlation waveform SC, which is defined between two time positions corresponding to a correlation value "y" that has a predetermined difference "H1" from the peak value (i.e., maximum value) "p(n+1)" of the correlation waveform SC, and outputs the detected value as a first delay indicator e1($n$+1) (=d1($n$+1)) in the symbol duration (n+1). Generally, the reference correlation value "p(n+1)−H1" used to obtain the first delay indicator "e1($n$+1)" (i.e., the time interval "d1($n$+1)") differs from the reference correlation value "p(n)−H1" used to obtain the first delay indicator "e1($n$)" (i.e., the time interval "d1($n$)") since the peak value (i.e., maximum value) "p(n+1)" of the symbol duration (n+1) differs from the peak value (maximum value) "p(n)" of the previous symbol duration (n).

As described above, the first delay indicator calculator 14A1 detects the time interval d1($j$) in each symbol duration (duration (j); j=1, 2, . . . ) and sequentially outputs the detected time interval as the first delay indicator e1($j$).

The first delay indicator calculator 14A1 is constructed so as to output the time interval "d1($j$)" together with the delay indicator "e1($j$)" as the same value (i.e., e1($j$)=d1($j$)) so that a multipath delay time, multipath power information, a received input level, and the like are obtained.

Here, the first delay indicator calculator 14A1 generates the symbol division time t(n) from the synchronization signal SC from the correlator 12. The symbol division time t(n) is a time for dividing the n-th symbol duration (duration (n)) and the (n+1)th symbol duration (duration (n+1)). The symbol division times do not necessarily exactly match symbol durations of OFDM modulated signals and only need to be defined so as to enable synchronization of symbol periods.

Figure 3:
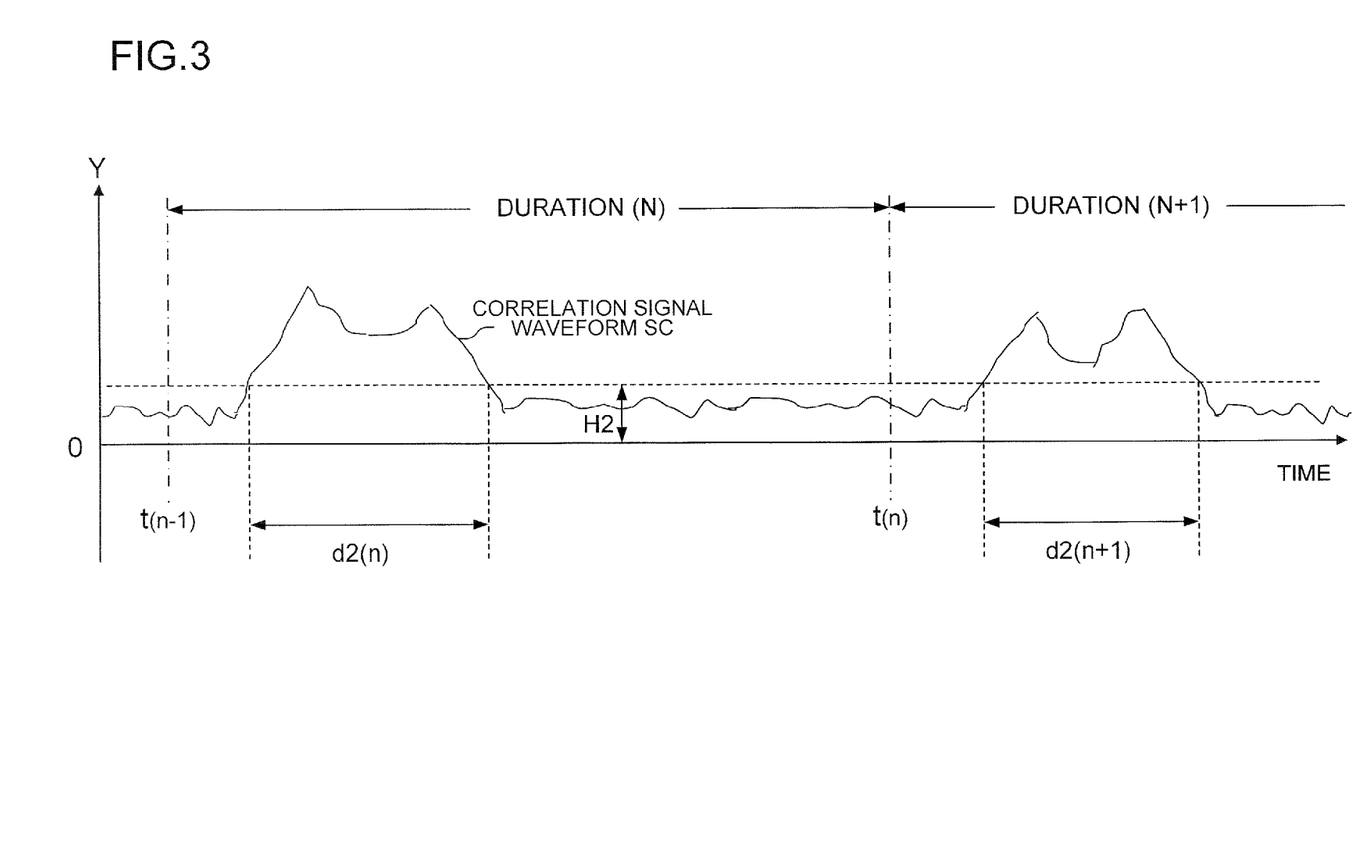
FIG. 3 illustrates a time interval $d2(n)$ of a correlation waveform SC detected by a second delay indicator calculator A2.

As shown in FIG. 3, the second delay indicator calculator (A2) 14A2 compares the correlation value "y" with a predetermined correlation value of "H2" as a reference value in each symbol duration (duration (j), j=1, 2, . . . ). The second delay indicator calculator 14A2 detects a time interval, during which the correlation value "y" is equal to or greater than the reference value "H2," as a delay time interval (which will also be referred to as a "second delay characteristic value"). More specifically, in the n-th symbol duration (duration (n)) that begins at a symbol division time "t(n−1)" and ends at "t(n)," the second delay indicator calculator 14A2 detects a time interval of "d2(n)" during which the correlation value "y" of a correlation waveform SC is equal to or greater than the reference value "H2."

In the next symbol duration (i.e., (n+1) the symbol duration (n+1)), using the same reference value "H2" as that for the symbol duration (n), the second delay indicator calculator 14A2 detects a time interval of "d2(n+1)," during which the correlation value "y" is equal to or greater than the reference value "H2."

The second delay indicator calculator 14A2 also calculates a difference "Δ2" between the time interval "d2(n)" of the current symbol duration (n) and the time interval "d2(n−1)" of the previous symbol duration (n−1). More specifically, the second delay indicator calculator 14A2 calculates an absolute difference "Δ2(n)" between the time interval of the current OFDM symbol and the time interval of the immediately previous OFDM symbol (Δ2(n)=|d2(n)−d2(n−1)|). The second delay indicator calculator 14A2 outputs the calculated difference Δ2(n) as a second delay indicator (delay indicator value) e2(n) (=Δ2(n)).

In the same manner, the second delay indicator calculator 14A2 calculates a time interval difference "Δ2(n+1)" in the next symbol duration (duration (n+1)) (i.e., Δ2(n+1)=|d2(n+1)−d2(n)|) and outputs the calculated difference Δ2(n+1) as a second delay indicator e2(n+1) (=Δ2(n+1)).

As described above, the second delay indicator calculator 14A2 detects the time interval d2(j) in each symbol duration (duration (j); j=1, 2, . . . ) and calculates a time interval difference "Δ2(j)" from the detected time interval d2(j) and sequentially outputs the second delay indicator e2(j).

The second delay indicator calculator 14A2 may be constructed so as to output the time interval "d2(j)" together with the delay indicator "e2(j)" as shown in FIG. 1 so that a multipath delay time and the like are obtained.

Figure 4:
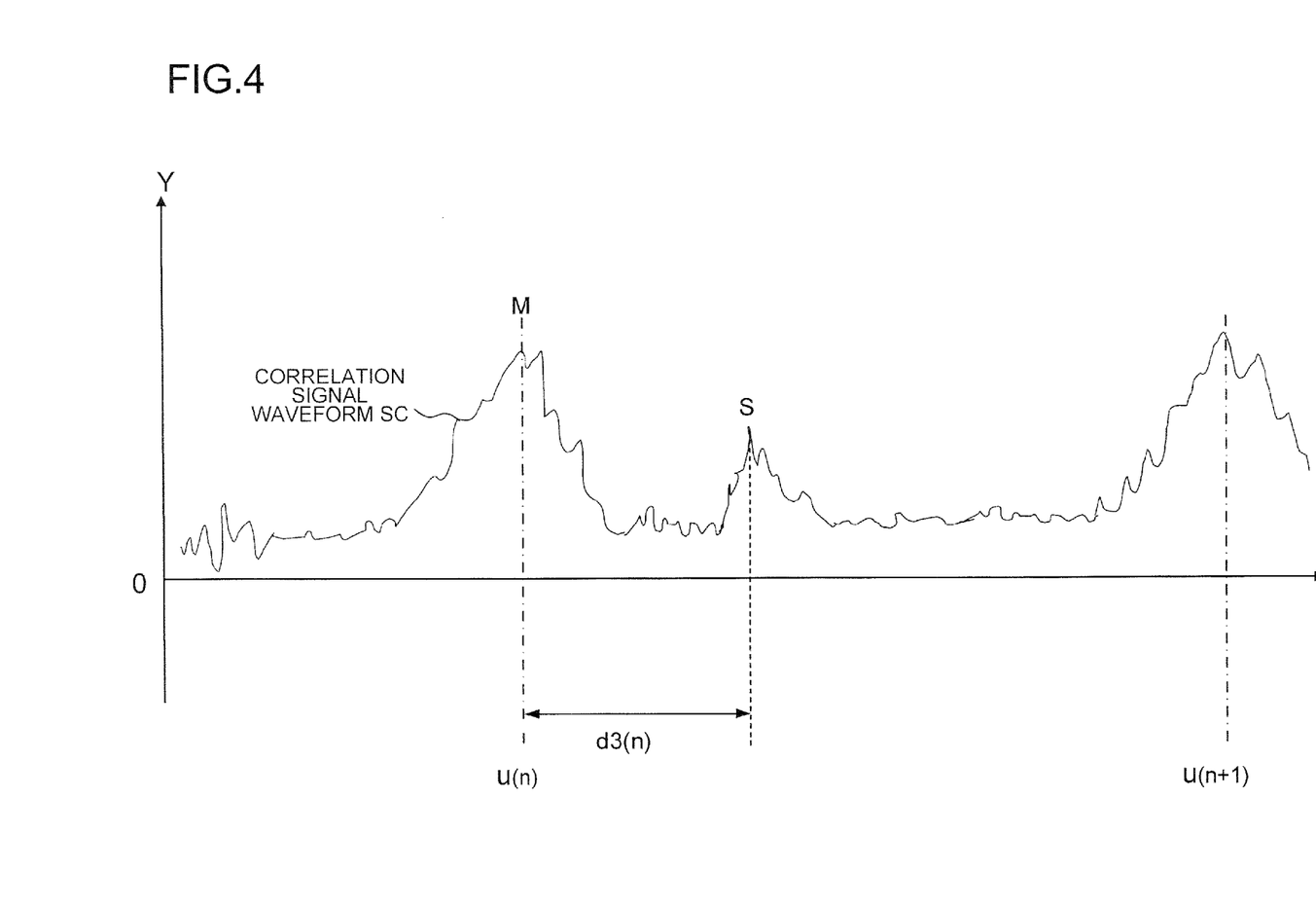
FIG. 4 illustrates a time interval $d3(n)$ of a correlation waveform SC detected by a third delay indicator calculator A3.

As shown in FIG. 4, the third delay indicator calculator (A3) 14A3 detects a time difference d3(n) between peak values M and S of a correlation waveform SC due to a main path and a delay path of the correlation waveform SC in an n-th symbol duration (duration (n)) that begins at a symbol division time "t(n−1)" and ends at "t(n)." The time difference d3(n) will also be referred to as a "third delay characteristic value."

The third delay indicator calculator 14A3 also calculates a difference Δ3 between the time difference d3(n) in the current symbol duration (n) and a time difference d3(n−1) in a previous symbol duration (n−1). More specifically, the third delay indicator calculator 14A3 calculates an absolute difference "Δ3(n)" between the time difference d3(n) between main and delay paths of the current OFDM symbol and the time difference d3(n−1) between main and delay paths of the immediately previous OFDM symbol (Δ3(n)=|d3(n)−d3(n−1)|). The third delay indicator calculator 14A3 outputs the calculated difference Δ3(n) as a third delay indicator (delay indicator value) e3(n) (=Δ3(n)).

In the same manner, the third delay indicator calculator 14A3 calculates a time difference d3(n+1) between main and delay paths in the next symbol duration (duration (n+1)) and calculates a difference "Δ3(n+1)" from the detected time difference in the next symbol duration (duration (n+1)) (i.e., Δ3(n+1) (=|d3(n+1)−d3(n)|)) and outputs the calculated difference Δ3(n+1) as a third delay indicator e3(n+1) (=Δ3(n+1)).

As described above, the third delay indicator calculator 14A3 detects the time difference d3(j) in each symbol duration (duration (j), j=1, 2, . . . ) and calculates a difference "Δ3(j)" from the detected time difference d3(j) and sequentially outputs the third delay indicator e3(j).

The third delay indicator calculator 14A3 may be constructed so as to output the time difference "d3(j)" together with the delay indicator "e3(j)" as shown in FIG. 1 so that a multipath delay time and the like are obtained.

The description was given with reference to an example where the first to third delay indicator calculators (A1, A2, and A3) 14A1, 14A2, and 14A3 calculate and output, as delay indicators, the first delay indicator e1(j) (=d1(j)), the second delay indicator e2(j) (=|d2(j)−d2(j−1)|), and the third delay indicator e3(j) (=|d3(j)−d3(j−1)|). Although the following description is exemplified by these delay indicators, the invention is not limited to the delay indicators.

Figure 9:
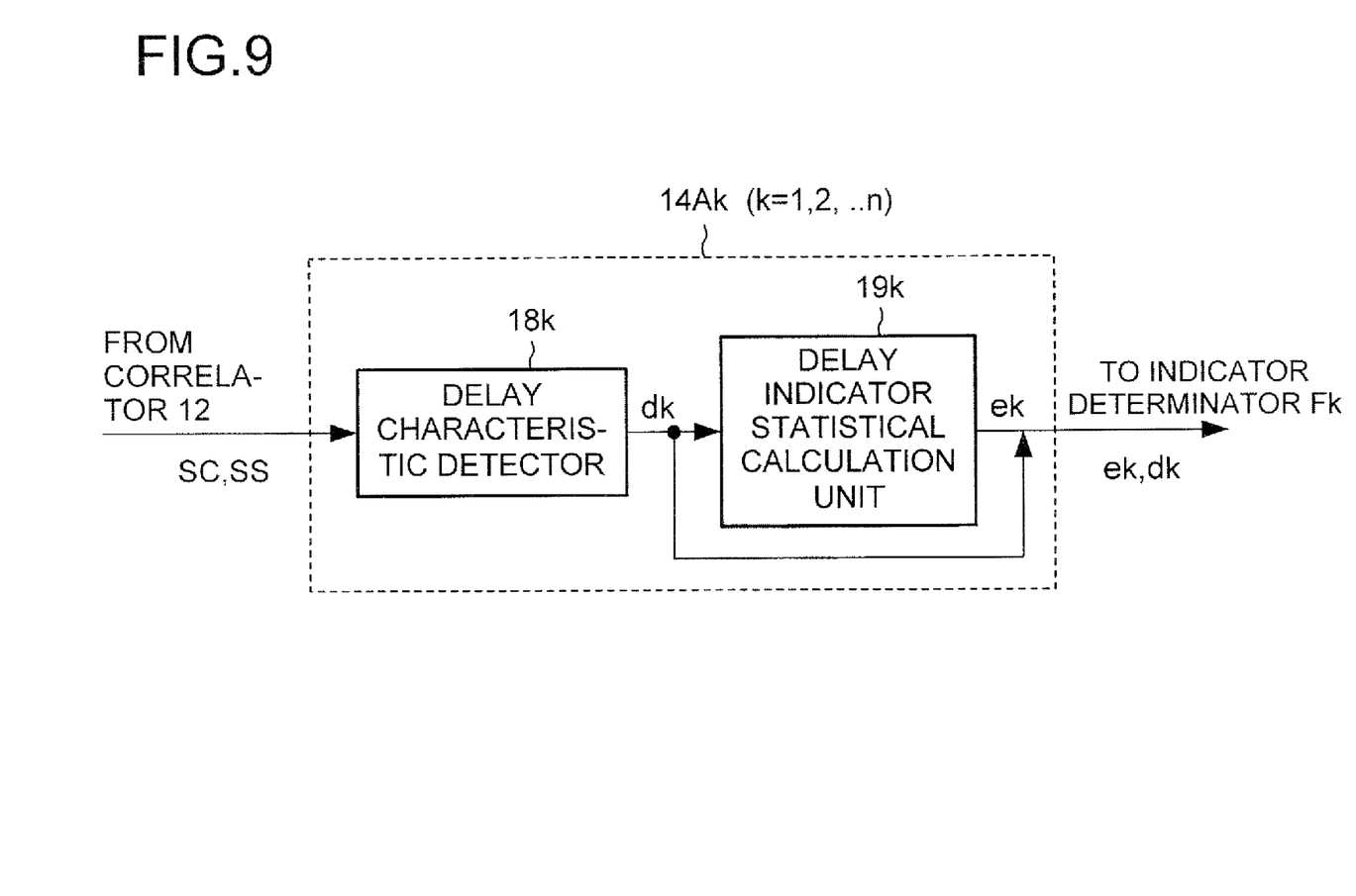
FIG. 9 is a block diagram illustrating a configuration of a delay indicator calculator including a delay characteristic detector and a delay indicator statistical calculation unit.

For example, in the case where 1st to n-th delay indicator calculators A1 to An are provided, a k-th delay indicator calculator Ak (k=1, 2, . . . , n) may include a delay characteristic detector 18k that detects delay information regarding multipath delay (which will also be referred to as a "delay characteristic value") as a value of "dk" and a delay indicator statistical calculation unit 19k that calculates a delay indicator of "ek" using the detected value "dk" as shown in FIG. 9. More specifically, the delay indicator statistical calculation unit 19k may be constructed so as to calculate and output, as the delay indicator "ek," a statistical value (for example, the average or variation (or dispersion)) of the detected value "dk" rather than the first delay indicator e1(j) (=d1(j)), the second delay indicator e2(j) (=|d2(j)−d2(j−1)|), and the third delay indicator e3(j) (=|d3(j)−d3(j−1)|).

Delay Indicators and Transmission Path States

Reference will now be made to relations between the detected values, the delay indicators, and the transmission path states. Here, the following 5 elements (state elements) can be considered transmission path states.

(i) Delay Time Difference between Main and Delay Path Signals of Multipath (ii) Power Difference between Main and Delay Path Signals of Multipath (iii) Noise (iv) Movement Speed of Demodulation Device (v) Input Power Level of Received Signal Relations between the transmission path states (state elements) and the detected values d1 to d3 (delay indicators e1 to e3) of the first to third delay indicator calculators (A1, A2, and A3) 14A1, 14A2, and 14A3 will now be described with reference to FIG. 5. FIG. 5 illustrates relations between the multipath states (i.e., delay time between paths and power difference between paths), the noise state, the movement speed state, and the received input level state, which are the transmission path state elements, and the detected values d1 to d3 (delay indicators e1 to e3) of the first to third delay indicator calculators A1, A2, and A3. In FIG. 5, the case where the transmission path state can be determined from the detected value is denoted by an open circle "○".

In the case of the first delay indicator calculator A1, information regarding multipath states (i.e., delay time between paths and power difference between paths) among the transmission path states is obtained from the detected value (i.e., the first delay characteristic value) "d1" and it is thus possible to determine the corresponding states. However, it is difficult to determine the multipath and noise states from only the detected value "d1" although the information regarding the transmission path noise state is obtained from the detected value "d1."

In addition, information of the received input power level is obtained although it is difficult to obtain information regarding the movement speed of the demodulation device.

In the case of the second delay indicator calculator A2, information regarding multipath states including delay time between paths among the transmission path states is obtained from the detected value (i.e., the second delay characteristic value) "d2" and it is thus possible to determine the corresponding states. However, it is difficult to obtain information regarding power difference between paths.

Information regarding noise is also obtained based on the fact that the detected value "d2" becomes unstable as the correlation floor level increases when noise is present and it is thus possible to determine the corresponding state. That is, it is possible to detect the noise state from the variation "Δ2" of the detected value "d2" among symbols.

However, it is difficult to obtain information regarding the movement speed of the demodulation device and the received input power level.

In the case of the third delay indicator calculator A3, multipath information can be detected by detecting a time difference of "d3" between correlation peaks (i.e., the third delay characteristic value). However, it is difficult to detect the multipath information during in-motion reception during which peak positions easily vary.

On the other hand, there is an advantage in that information regarding the movement speed of the demodulation device (i.e., receiver) is obtained from variation "Δ3" of the detected value "d3" among OFDM symbols and it is thus possible to determine the corresponding state.

However, it is difficult to obtain information regarding the transmission path noise state and the received input power level.

From the characteristics described above, it is possible to estimate the transmission path states using the detected values d1 to d3 and the calculated delay indicators "e1" to "e3" from the first to third delay indicator calculators A1, A2, and A3 and combinations thereof. Reference will now be made in more detail to the transmission path states (i) to (v).

(i) Delay Time Difference between Main and Delay Path Signals of Multipath

Characteristic changes (changes of states) can be detected using any of the detected values (i.e., delay characteristic values) d1 to d3 of the first to third delay indicator calculators A1, A2, and A3.

(ii) Power Difference between Main and Delay Path Signals of Multipath

Each of the detected values d1 and d3 of the first and third delay indicator calculators A1 and A3 has an indicator characteristic of this state. More specifically, estimating both the detected values d1 and d3 can increase the reliability of power difference estimation, compared to when estimating one of the detected values d1 and d3.

(iii) Noise

Each of the detected values d1 and d2 of the first and second delay indicator calculators A1 and A2 has an indicator characteristic of this state. With regard to the detected value d2, an indicator of the magnitude of noise (a noise state) can be obtained by estimating the second delay indicator e2 that is the dispersion (variation Δ2) of the detected value d2 (i.e., variation Δ2=e2). Here, the dispersion (variation) of the detected value d (d1, d2, or d3) is a variation of the detected value d that is detected every OFDM symbol.

Combining the first delay indicator e1 (=detected value d1) and the second delay indicator e2 (=variation Δ2 of detected value d2) enables more highly accurate noise state estimation.

(iv) Movement Speed of Receiver (Demodulation Device)

The detected value d3 of the third delay indicator calculator A3 has an indicator characteristic of this state. More specifically, the magnitude of the movement speed (a movement speed state) can be estimated from the magnitude of the third delay indicator e3 (=variation Δ3 of detected value d3). That is, when the third delay indicator e3 is large, it can be estimated that the movement speed of the demodulation device is high.

Although the movement speed is not a "state" of the transmission path, the movement speed of the demodulation device can also be considered a transmission path state that is to be estimated since a change in the movement speed indicates a change in the length of the transmission path.

(v) Input Power Level of Received Signal

The detected value d1 of the first delay indicator calculator A1 has an indicator characteristic of this state. That is, an input power level state can be estimated from the first delay indicator e1 (=detected value d1). More specifically, when the first delay indicator e1 is small, it can be estimated that the input power level of the received signal is high.

Estimation Method for Transmission Path State

In the above description, we showed that the states (i) to (v) (also referred to as "state elements") can be estimated using combinations of the delay indicators e1 to e3 calculated by the first to third delay indicator calculators A1, A2, and A3. Reference will now be made in detail to a process for estimating transmission path states using the delay indicators.

The delay indicators e1 to e3 calculated by the first to third delay indicator calculators (A1, A2, and A3) 14A1, 14A2, and 14A3 are provided to the indicator determinators (F1, F2, and F3) 15F1, 15F2, and 15F3, respectively.

First, the indicator determinators 15F1, 15F2, and 15F3 calculate respective proportions (i.e., probabilities) of delay indicator values e1 to e3, which exceed respective predetermined reference values (determination reference values), among delay indicator values e1 to e3 of a plurality of symbol durations. More specifically, whether or not the delay indicator values e1 to e3 exceed the respective determination reference values is determined (i.e., a yes/no determination is performed based on the determination reference values) in order to facilitate use of the delay indicator values e1 to e3 in the combination-based determination, and then determination values (hereinafter referred to as "delay determination values") of the state elements, which can be estimated from the delay indicators, are obtained using the probabilities of the delay indicator values e1 to e3 in the plurality of symbol durations. Transmission path states are estimated by combining these determination values. Employing this method enables reliable determination.

The transmission path state estimation method will now be described in more detail with reference to a detailed example. Of course, the numerical values used in the following description are only illustrative and can be changed and applied appropriately.

A process for estimating the following states is described below in detail as an example of "transmission path state estimation."

Transmission Path States:

(i) Multipath delay time difference equal to or greater than 100 µs (Condition 1), (ii) Multipath power difference equal to or less than 2 dB (Condition 2), (iii) Noise (C/N) ratio equal to or higher than 10 dB (Condition 3), and (iv) Movement speed equal to or less than 10 km/h (Condition 4).

In this example, the input power level of received signal is excluded from the state elements for estimation.

First, the first indicator determinator 15F1 calculates a first delay determination value s1 based on the first delay indicator e1 (detected value d1). That is, the first indicator determinator 15F1 calculates:

$s1$=probability of "$e1(=d1)>150$ µs."

More specifically, the first indicator determinator 15F1 calculates the first delay determination value s1 under the assumption that the reference value for the first delay determination (i.e., the first determination reference value) is 150 µs and that the proportion (i.e., probability) of first delay indicators e1 exceeding the first determination reference value among first delay indicators e1 obtained for a plurality of OFDM symbol durations is defined. For example, when first delay indicators e1 of 7 OFDM symbol durations among first delay indicators e1 ($e1(1)$, $e1(2)$, ..., $e1(10)$) obtained for 10 OFDM symbols exceed 150 µs, the probability of the first delay indicator e1 is 70% and therefore the first delay determination value s1 is 70% (=0.7).

The second indicator determinator 15F2 calculates a second delay determination value s2 based on the second delay indicator e2 ($=e2(j)=|d2(j)-d2(j-1)|$). That is, the second indicator determinator 15F2 calculates:

$s2$=probability of "$e2>50$ µs."

More specifically, the second indicator determinator 15F2 calculates the second delay determination value s2 under the assumption that the reference value for the second delay determination (i.e., the second determination reference value) is 50 µs and that the proportion (i.e., probability) of second delay indicators e2 exceeding the second determination reference value among second delay indicators e2 obtained for a plurality of OFDM symbol durations is defined in the same manner as when the first delay determination value is calculated.

The third indicator determinator 15F3 calculates a third delay determination value s3 based on the third delay indicator e3 ($=e3(j)=|d3(j)-d3(j-1)|$). That is, the third indicator determinator 15F3 calculates:

$s3$=probability of "$e3>100$ µs."

More specifically, the third indicator determinator 15F3 calculates the third delay determination value s3 under the assumption that the reference value for the third delay determination (i.e., the third determination reference value) is 100 µs and that the proportion (i.e., probability) of third delay indicators e3 exceeding the third determination reference value among third delay indicators e3 obtained for a plurality of OFDM symbol durations is defined.

As described above with reference to FIG. 5, (i) multipath delay time difference and (ii) multipath power difference state can be estimated from the first delay determination value s1. Similarly, (iii) noise state can be estimated from a combination of the first and second delay determination values s1 and s2 and (iv) movement speed state can be estimated from the third delay determination value s3.

The first, second, and third indicator determination values s1, s2, and s3 are provided to the transmission path state estimator 17. The transmission path state estimator 17 generates a transmission path state estimation value g based on the first, second, and third indicator determination values s1, s2, and s3.

The transmission path state estimator 17 generates the transmission path state estimation value g based on the indicator determination values. The following description is given of an example where the transmission path state estimator 17 performs weighted calculation on the first to third indicator determination values s1 to s3 to generate the transmission path state estimation value g.

First, the transmission path state estimator 17 generates state element estimation values $c(i)$ (i: 1, 2, 3, 4) that are estimation values of the state elements (i) to (iv) (corresponding respectively to the Conditions 1 to 4). In this example, binary determination is performed on each state element, i.e., determination is made as to whether the state element estimation value $c(i)$ is 0 or 1.

More specifically, as to (i) multipath delay time difference and (ii) multipath power difference (conditions 1 and 2) among the state elements, $c(1)=c(2)=1$ when $s1>50\%$ and $c(1)=c(2)=0$ when $s1\leq50\%$.

That is, when the indicator determination value s1 exceeds a threshold rate of 50%, this indicates that the multipath delay time difference as the state element (i) is estimated to be large (specifically, equal to or greater than 100 µs) ($c(1)=1$) and the multipath power difference as the state element (ii) is estimated to be small (specifically, less than or equal to 2 dB) ($c(2)=1$). On the other hand, when the indicator determination value s1 is less than or equal to the threshold rate 50%, this indicates that (i) multipath delay time difference is estimated to be small (specifically, less than 100 µs) ($c(1)=0$) and (ii) multipath power difference is estimated to be large (specifically, above 2 dB) ($c(2)=0$). The numerical values "100 µs" and "2 dB" described above are reference values for estimation and, of course, the description of the numerical values does not mean that comparison is actually performed with the numerical values.

In addition, as to (iii) noise (condition 3) among the state elements, $c(3)=1$ when $w1\times s1+w2\times s2>80\%$ and $c(3)=0$ when $w1\times s1+w2\times s2\leq80\%$, where w1 and w2 are respective weight factors for the indicator determination values s1 and s2.

That is, when the value obtained through weighted calculation of the indicator determination values s1 and s2 exceeds a threshold rate of 80%, this indicates that the noise ratio (C/N) of the transmission path is estimated to be large (specifically, equal to or greater than 10 dB) ($c(3)=1$). On the other hand, when the value obtained through weighted calculation of the indicator determination values s1 and s2 is less than or equal to the threshold rate 80%, this indicates that the noise ratio is estimated to be small (specifically, less than 10 dB) ($c(3)=0$).

In addition, as to (iv) movement speed (condition 4) among the state elements, $c(4)=1$ when $w3\times s3>80\%$ and $c(4)=0$ when $w3\times s3\leq80\%$ where w3 is a weight factor for the indicator determination value s3.

That is, when the value obtained through weighted calculation of the indicator determination value s3 exceeds a threshold rate of 30%, this indicates that the movement speed is estimated to be high (specifically, equal to or greater than 10 km/h) (c(4)=1). On the other hand, when the value obtained through weighted calculation of the indicator determination value s3 is less than or equal to the threshold rate 30%, this indicates that the movement speed is estimated to be low (specifically, less than 10 km/h) (c(4)=0).

The weight factors w1 to w3 are set appropriately according to the accuracy or reliability of the detected indicator determination values s1 to s3.

Accordingly, the transmission path state estimator 17 generates the transmission path estimation value g according to the above transmission path state conditions 1 to 4. More specifically, the transmission path state estimator 17 determines:

$$g=(c(1) \text{ \& } c(2)) \text{ \& } c(3) \text{ \& } c(4),$$

where "&" represents an AND (logical sum) operation.

That is, the transmission path state estimator 17 outputs a binary value of "1" as the transmission path state estimation value g (i.e., g=1) when all the conditions 1 to 4 are satisfied and outputs a binary value of "0" as the transmission path state estimation value g (i.e., g=0) when not all the conditions 1 to 4 are satisfied.

Specifically, the case where g=1 corresponds to the case where the multipath is large and the movement speed is low.

Although the transmission path state estimator 17 generates the binary state element estimation value c(i) and the binary transmission path estimation value in the above example, the transmission path state estimator 17 may also be constructed so as to generate and output a multinary or many-valued (higher than binary) state element estimation value c(i) and transmission path estimation value.

For example, the transmission path state estimator 17 may be constructed so as to generate state element estimation values c(i) (for example, c(i)=2, 1, and 0) corresponding to large, middle, and small multipath delay time differences of the transmission path state (i) or high, middle, and low movement speeds of (iv). The transmission path state estimator 17 may also be constructed so as to generate a multinary (higher than binary) transmission path estimation value, regardless of whether the state element estimation value c(i) is binary or higher. For example, when the multipath delay time difference of the transmission path state (i) is binary and the movement speed of (iv) is binary, the transmission path state estimator 17 may generate and output quaternary transmission path estimation values corresponding to the four possible values of (i) and (iv). Of course, these are only examples and the transmission path state estimator 17 may also be constructed so as to generate a multinary (higher than binary) transmission path estimation value by combining various state element estimation values c(i).

OFDM Demodulation

The transmission path state estimation value g from the transmission path state estimator 17 is provided to a demodulation mode switch 21 that performs switching of operation modes of an OFDM demodulator 20.

The OFDM demodulator 20 is constructed so as to switch between operation modes according to the state of a transmission path of an OFDM signal. For example, the OFDM demodulator 20 is constructed so as to handle different transmission path states such as whether or not a multipath has occurred, whether the multipath is large or small, and whether the movement speed is high or low.

For example, a demodulator, which receives an OFDM modulated signal having a scattered pilot (SP) signal such as a terrestrial digital broadcast, generates reference phase information from the known SP signal in order to demodulate a signal such as a QPSK or 16QAM signal. When the received signal contains noise, the influence of noise carried in the SP signal degrades the reference phase information, thereby increasing the bit error rate (BER). To reduce this influence, the demodulator may be constructed so as to perform processing such as averaging a large number of SP signals and to generate reference phase information from the SP signals.

However, in the case where the transmission path constantly varies, for example when the demodulation device moves at a high movement speed, generating the reference phase information from the large number of SP signals may increase the BER rather than reduce it since transmission path information included in SP information acquired in the past is different from current transmission path information.

For example, taking into consideration the method of processing SP signals as described above, the OFDM demodulator 20 is constructed so as to have demodulation operation modes suited to changes in the transmission path and to enable switching between the operation modes.

The OFDM demodulator 20 switches between the operation modes based on the transmission path state estimation value g from the transmission path state estimator 17. Specifically, in the above embodiment, the case where g=1 corresponds to the case where the multipath is large and the movement speed is low. Accordingly, the OFDM demodulator 20 operates in a mode robust to multipaths when g=1 and in a normal mode when g=0.

The first embodiment has been described with reference to the case where transmission path states are estimated using the first to third delay indicator values. However, the state elements and the transmission path states can be estimated using a combination of at least two of the first to third delay indicator values (and indicator determination values calculated from the at least two delay indicator values).

Especially, the transmission path states and the state elements including not only the multipath states ((i) multipath delay time difference and (ii) multipath power difference) but also (iii) noise state, (iv) movement speed state, and (v) received input level state can be estimated using a combination of the at least two delay indicator values (indicator determination values).

Second Embodiment

Figure 6:
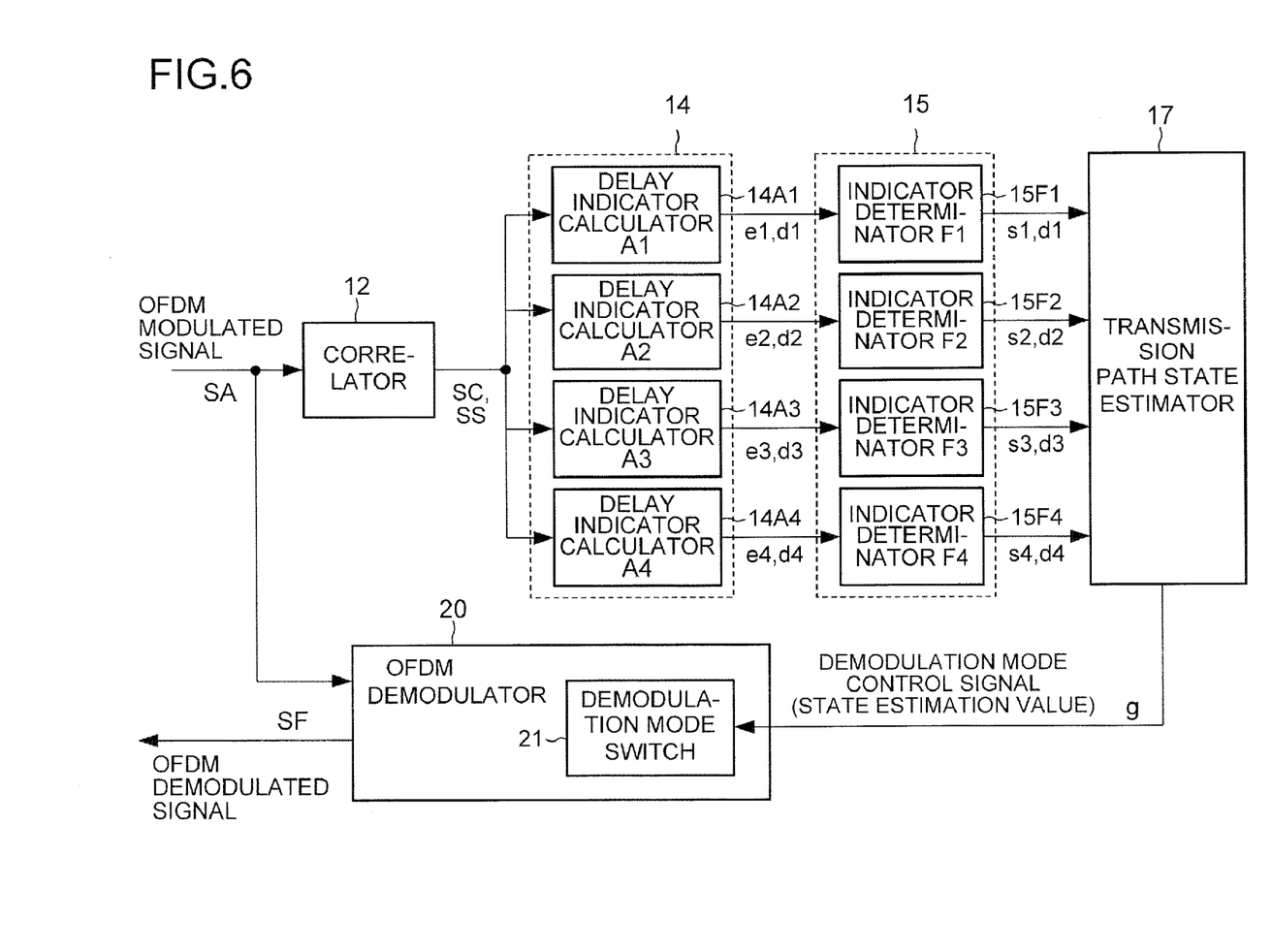
FIG. 6 schematically illustrates an example of an OFDM demodulation device according to a second embodiment of the invention.

FIG. 6 schematically illustrates an example of the OFDM demodulation device 10 according to a second embodiment of the invention. In this embodiment, the OFDM demodulation device 10 further includes a fourth delay indicator calculator (A4) 14A4 and a fourth indicator determinator (F4) 15F4.

Figure 7:
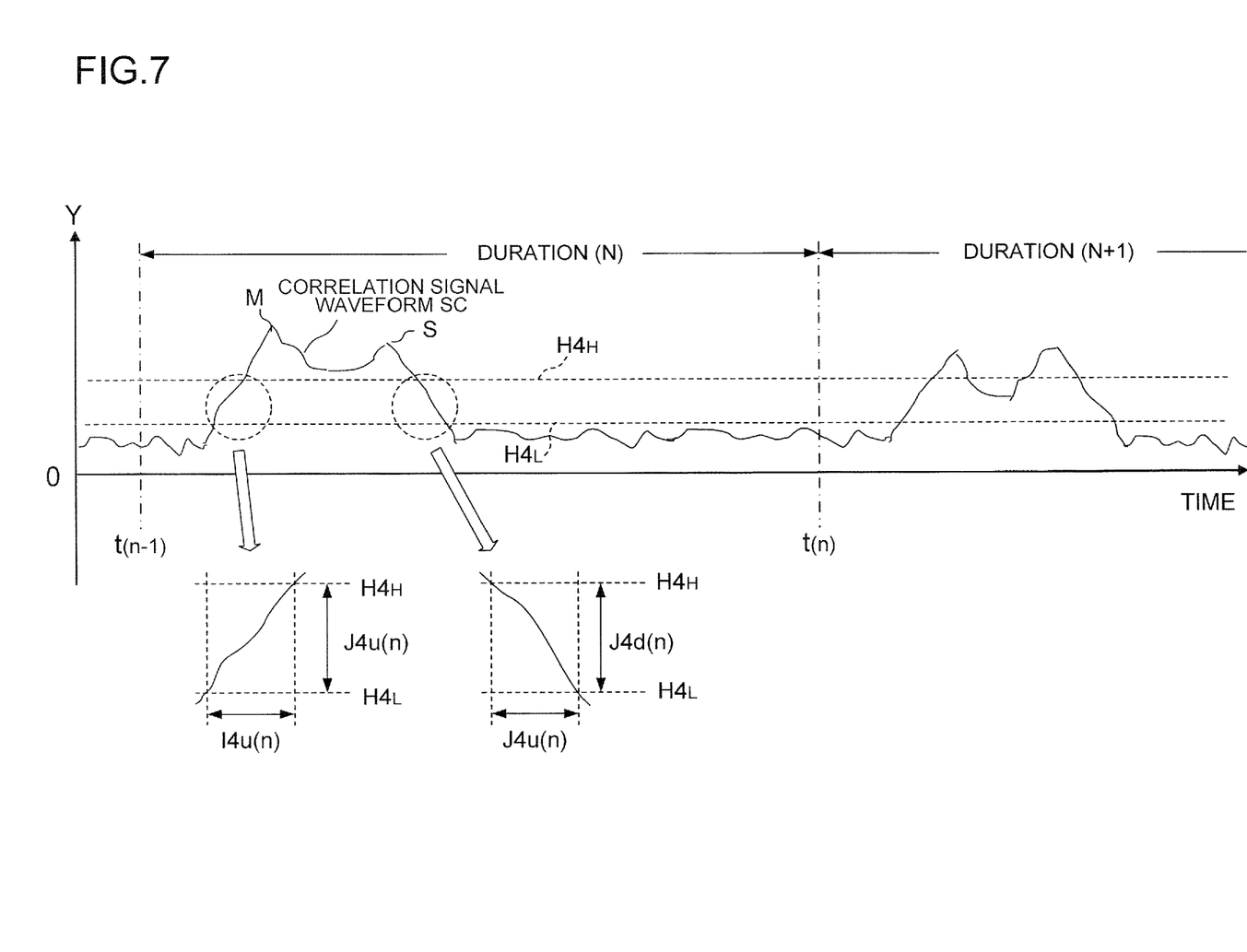
FIG. 7 illustrates gradients d4$u$ and d4$d$ of a correlation waveform SC detected by a fourth delay indicator calculator A4 in the second embodiment.

The fourth delay indicator calculator 14A4 detects gradients (slopes) of a trapezoidal waveform according to a correlation signal SC in each symbol duration (duration (j), j=1, 2, . . . ) as shown in FIG. 7.

More specifically, in the trapezoidal correlation waveform, the correlation signal level increases as a main path signal is received, forming a peak M, and decreases subsequent to a peak S corresponding to a delay path signal. The fourth delay indicator calculator 14A4 detects positive and negative gradients of the signal waveform corresponding to main and delay path signals of the correlation signal. More specifically, the fourth delay indicator calculator 14A4 determines points at which the correlation signal waveform and first and second reference levels H4L and H4H of the correlation value y cross each other and determines a positive gradient (J4$u$/I4$u$) and a negative gradient (J4$d$/I4$d$) using a formula "correlation value (y) difference/time difference."

In the next symbol duration (duration (n+1)), the fourth delay indicator calculator 14A4 determines a positive gradient (J4$u$/I4$u$=d4$u$) and a negative gradient (J4$d$/I4$d$=d4$d$) using the same reference values H4L and H4H as those of the symbol duration (n) in the same manner as described above.

The fourth delay indicator calculator 14A4 outputs the positive gradient (J4$u$/I4$u$) and the negative gradient (J4$d$/I4$d$) in the symbol duration (n) as fourth delay indicators e4($n$) (=(e4$u$ and e4$d$)=(d4$u$ and d4$d$)).

Figure 8:
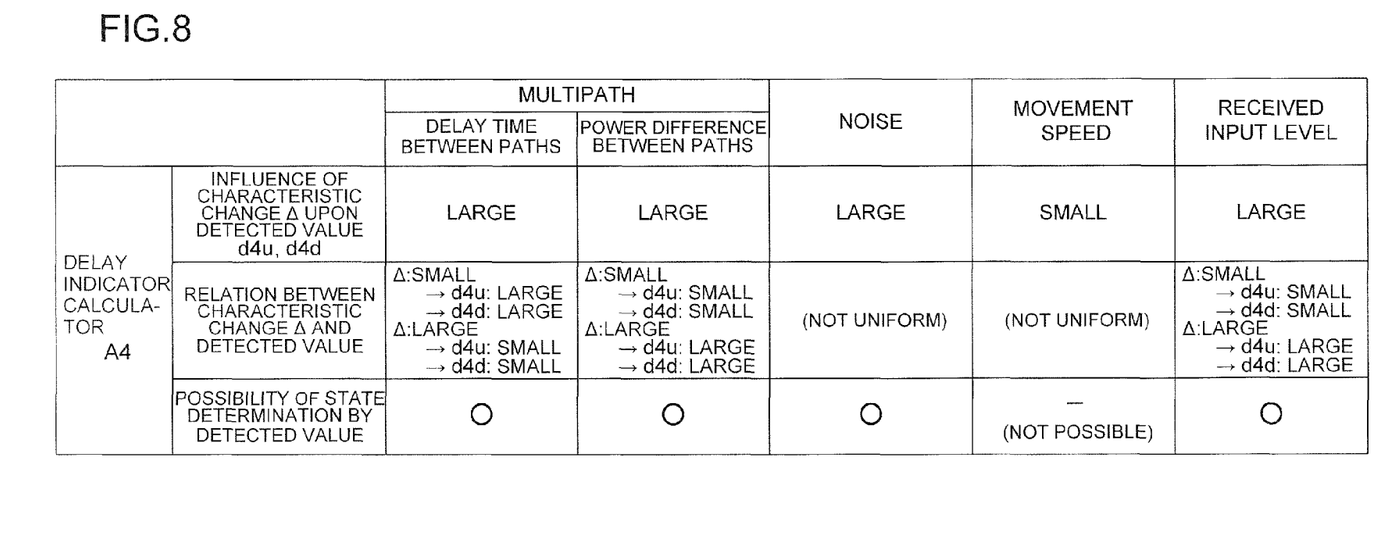
FIG. 8 illustrates relations between transmission path state elements and detected values calculated by a fourth delay indicator calculator A4.

Advantages of the method of estimating transmission path states using the fourth delay indicators e4$u$ and e4$d$ in combination with the first to third delay indicators are described below in detail with reference to FIG. 8.

(i) Delay Time Difference between Main and Delay Path Signals of Multipath

Changes of characteristics (or states) can be detected using the fourth delay indicators e4$u$ and e4$d$.

(ii) Power Difference between Main and Delay Path Signals of Multipath

Using the fourth delay indicators e4$u$ and e4$d$ with the first to third delay indicators can increase the reliability of power difference estimation.

(iii) Noise

It is difficult to estimate the noise state from the fourth delay indicators e4$u$ and e4$d$.

(iv) Movement Speed of Receiver (Demodulation Device)

It is difficult to estimate the movement speed state from the fourth delay indicators e4$u$ and e4$d$.

(v) Input Power Level of Received Signal

Using the fourth delay indicators e4$u$ and e4$d$ in combination with the first delay indicator can increase the reliability of input power level estimation.

The fourth delay indicators e4$u$ and e4$d$ are provided to the fourth indicator determinator 15F4. The fourth indicator determinator 15F4 calculates fourth delay determination values s4$u$ and s4$d$ based on the fourth delay indicators e4$u$ and e4$d$ (=detected characteristic values d4$u$ and d4$d$). That is, the fourth indicator determinator 15F4 calculates:

s4$u$=probability of "e4$u$>th4$u$"

s4$d$=probability of "e4$d$>th4$d$,"

where th4$u$ and th4$d$ are thresholds (fourth determination reference values).

More specifically, the probabilities of fourth delay indicators e4$u$ and e4$d$ greater than the fourth determination reference values th3$u$ and th3$d$ are defined and the fourth indicator determinator 15F4 calculates the fourth delay determination values s4$u$ and s4$d$ based on the defined probabilities.

Thus, using the fourth delay determination values s4$u$ and s4$d$ in combination with the first to third delay determination values can increase the accuracy and reliability of estimation of state elements (i), (ii), and (v) (estimation values c(i) (i=1, 2, 5)) as described above with reference to FIG. 8. Respective weight factors w1$u$ and w1$d$ are used for the fourth delay determination values s4$u$ and s4$d$ in the same manner as in the above embodiment.

The transmission path state estimator 17 generates a transmission path state estimation value g based on the state element estimation values c(i) in combination with the fourth delay determination values s4$u$ and s4$d$.

The OFDM demodulator 20 can perform correct demodulation operations according to changes of transmission path states by switching between operation modes according to the transmission path state estimation value g.

This embodiment has been described with reference to the case where transmission path states are estimated using the first to third delay indicator values or the first to fourth delay indicator values. However, the transmission path state elements and the transmission path states can also be estimated using a combination of at least two of the first to fourth delay indicator values.

As is apparent from the above description, the invention provides an OFDM demodulation device that can highly reliably estimate transmission path states and can perform correct demodulation operations according to changes of transmission path states.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

This application claims the benefit of Japanese Patent Application No. 2007-243597, which is hereby incorporated by reference as if fully set forth herein.

What is claimed is:

1. A demodulation device for demodulating an Orthogonal Frequency Division Multiplexing (OFDM) signal received through a transmission path, the demodulation device comprising:
a correlator for detecting a correlation signal based on the OFDM signal;
a delay indicator calculator for calculating at least two of a plurality of delay indicator values including a first delay indicator value indicating a delay time interval determined based on a correlation value having a predetermined difference from a maximum peak value of the correlation signal in a symbol duration of the OFDM signal, a second delay indicator value indicating a change of a delay time interval determined based on a time during which a value of the correlation signal is equal to or greater than a predetermined correlation value in the symbol duration of the OFDM signal, and a third delay indicator value indicating a change of a time difference between a main path peak and a delay path peak in the symbol duration of the OFDM signal;
a delay indicator determinator for calculating respective probabilities of the at least two delay indicator values exceeding respective reference values in a plurality of symbol durations of the OFDM symbol; and
a transmission path state estimator for generating a state estimation value of the transmission path based on the respective probabilities of the at least two delay indicator values.

2. The demodulation device according to claim 1, wherein the delay indicator determinator calculates respective probabilities of the first to third delay indicator values exceeding respective reference values and the transmission path state estimator performs weighted calculation on the respective probabilities to generate the state estimation value of the transmission path.

3. The demodulation device according to claim 1, wherein the transmission path state estimator estimates a noise state of the transmission path by performing weighted calculation on respective probabilities of the first and second delay indicator values exceeding respective reference values and estimates a state regarding movement speed of the demodulation device based on a probability of the third delay indicator value exceeding a predetermined threshold value.

4. The demodulation device according to claim 1, wherein
the delay indicator calculator calculates a fourth delay indicator value indicating a magnitude of a gradient of a correlation waveform based with regard to a main path peak and the delay path peak in the symbol duration of the OFDM signal,
the delay indicator determinator calculates respective probabilities of the first to fourth delay indicator values exceeding respective reference values, and
the transmission path state estimator generates a state estimation value of the transmission path based on the respective probabilities of the first to fourth delay indicator values.

5. The demodulation device according to claim 4, wherein the delay indicator calculator includes a statistical calculation unit that calculates the first to fourth delay indicator values through statistical calculation.

6. The demodulation device according to claim 4, wherein the transmission path state estimator estimates a noise state of the transmission path, a state regarding movement speed of the demodulation device, and a state regarding a received signal level of the OFDM signal.

7. The demodulation device according to claim 1, further comprising an OFDM demodulator that switches between demodulation operation modes based on the state estimation value.

8. A demodulation device for demodulating an Orthogonal Frequency Division Multiplexing (OFDM) signal received through a transmission path, the demodulation device comprising:
a correlator for detecting a correlation signal based on the OFDM signal;
a delay indicator calculator for calculating at least two of a plurality of delay indicator values including a first delay indicator value indicating a delay time interval determined based on a correlation value having a predetermined difference from a maximum peak value of the correlation signal in a symbol duration of the OFDM signal, a second delay indicator value indicating a change of a delay time interval determined based on a time during which a value of the correlation signal is equal to or greater than a predetermined correlation value in the symbol duration of the OFDM signal, a third delay indicator value indicating a change of a time difference between a main path peak and a delay path peak in the symbol duration of the OFDM signal, and a fourth delay indicator value indicating a magnitude of a gradient of a correlation waveform based with regard to a main path peak and the delay path peak in the symbol duration of the OFDM signal;
a delay indicator determinator for calculating respective probabilities of the at least two delay indicator values exceeding respective reference values in a plurality of symbol durations of the OFDM symbol; and
a transmission path state estimator for generating a state estimation value of the transmission path based on the respective probabilities of the at least two delay indicator values.

9. The demodulation device according to claim 8, wherein the delay indicator determinator calculates respective probabilities of the first to fourth delay indicator values exceeding respective reference values and the transmission path state estimator performs weighted calculation on the respective probabilities to generate the state estimation value of the transmission path.

10. The demodulation device according to claim 8, wherein the delay indicator calculator includes a statistical calculation unit that calculates the first to fourth delay indicator values through statistical calculation.

11. The demodulation device according to claim 8, wherein the transmission path state estimator estimates a noise state of the transmission path, a state regarding movement speed of the demodulation device, and a state regarding a received signal level of the OFDM signal.

12. The demodulation device according to claim 8, further comprising an OFDM demodulator that switches between demodulation operation modes based on the state estimation value.

13. A method for demodulating an Orthogonal Frequency Division Multiplexing (OFDM) signal received through a transmission path, the method comprising:
detecting a correlation signal based on a received OFDM signal;
a delay indicator calculating step of calculating at least two of a plurality of delay indicator values including a first delay indicator value indicating a delay time interval determined based on a correlation value having a predetermined difference from a maximum peak value of the correlation signal in a symbol duration of the OFDM signal, a second delay indicator value indicating a change of a delay time interval determined based on a time during which a value of the correlation signal is equal to or greater than a predetermined correlation value in the symbol duration of the OFDM signal, and a third delay indicator value indicating a change of a time difference between a main path peak and a delay path peak in the symbol duration of the OFDM signal;
a delay indicator determining step of calculating respective probabilities of the at least two delay indicator values exceeding respective reference values in a plurality of symbol durations of the OFDM symbol; and
a transmission path state estimating step of generating a state estimation value of the transmission path based on the respective probabilities of the at least two delay indicator values.

14. The method according to claim 13, wherein,
the delay indicator determining step calculates respective probabilities of the first to third delay indicator values exceeding respective reference values, and
the transmission path state estimating step performs weighted calculation on the respective probabilities to generate the state estimation value of the transmission path.

15. The method according to claim 13, wherein the transmission path state estimating step estimates a noise state of the transmission path by performing weighted calculation on respective probabilities of the first and second delay indicator values exceeding respective reference values and estimates a state regarding movement speed of the demodulation device based on a probability of the third delay indicator value exceeding a predetermined threshold value.

* * * * *